United States Patent
Cloonan et al.

(10) Patent No.: US 7,047,553 B1
(45) Date of Patent: May 16, 2006

(54) METHOD AND APPARATUS FOR DECREASING CABLE INSTALLATION TIME AND CABLE INSTALLATION FAULTS

(75) Inventors: Thomas J. Cloonan, Lisle, IL (US);
Daniel W. Hickey, Oswego, IL (US);
Thomas J. Mack, Palatine, IL (US);
David R. Johnson, Naperville, IL (US)

(73) Assignee: Arris International, Inc., Suwanee, GA (US)

( * ) Notice: Subject to any disclaimer, the term of this patent is extended or adjusted under 35 U.S.C. 154(b) by 1040 days.

(21) Appl. No.: 09/680,113

(22) Filed: Oct. 5, 2000

(51) Int. Cl.
*H04N 7/16* (2006.01)

(52) U.S. Cl. ............ 725/144; 725/111; 725/91; 725/114; 725/138; 439/61

(58) Field of Classification Search ............ 725/111, 725/82, 91, 93, 114, 116, 117, 138, 144; 348/439, 348/836; 439/61
See application file for complete search history.

(56) References Cited

U.S. PATENT DOCUMENTS

| | | | | |
|---|---|---|---|---|
| 4,151,580 A | * | 4/1979 | Struger et al. ............. 361/801 |
| 5,726,668 A | * | 3/1998 | Clement ..................... 715/723 |
| 5,740,020 A | * | 4/1998 | Palatov ...................... 361/796 |
| 6,078,504 A | * | 6/2000 | Miles ......................... 361/727 |
| 6,469,634 B1 | * | 10/2002 | Williams et al. ....... 340/825.72 |
| 6,477,424 B1 | * | 11/2002 | Thompson et al. ........... 607/60 |
| 6,532,550 B1 | * | 3/2003 | Crew et al. .................. 714/11 |
| 6,574,110 B1 | * | 6/2003 | Budinger et al. ........... 361/729 |
| 6,623,278 B1 | * | 9/2003 | Follingstad et al. ......... 439/64 |
| 6,637,033 B1 | * | 10/2003 | Cloonan et al. ............ 725/117 |
| 6,748,474 B1 | * | 6/2004 | Caldara et al. ............. 710/301 |
| 6,798,341 B1 | * | 9/2004 | Eckel et al. ................ 340/521 |
| 6,802,032 B1 | * | 10/2004 | Budinger et al. ............ 714/46 |
| 6,898,182 B1 | * | 5/2005 | Cloonan ..................... 370/232 |
| 2002/0093966 A1 | * | 7/2002 | Liva et al. .................. 370/400 |

* cited by examiner

*Primary Examiner*—Chris Kelley
*Assistant Examiner*—Annan Q. Shang

(57) ABSTRACT

A method and apparatus for decreasing cable installation times and cable installation faults is disclosed. The back panel of the CTMS has a light source, for example an LED associated with each connector on the back plane. When a circuit card is plugged into the front plane of the CMTS the card activates the light source on the back plane to indicate whether an active channel is connected to the connector and what type of channel the active channel is.

27 Claims, 4 Drawing Sheets

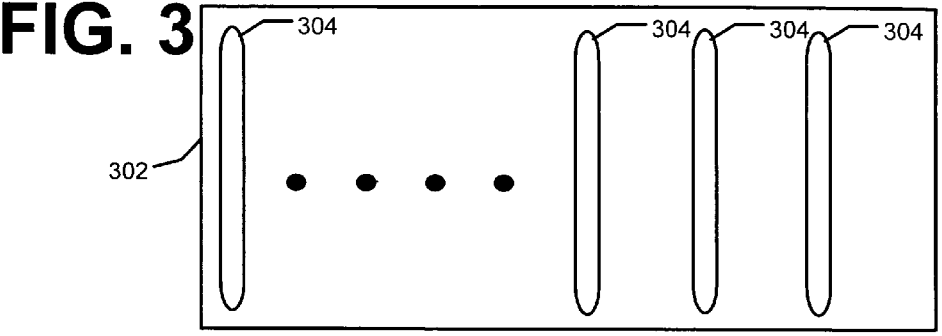
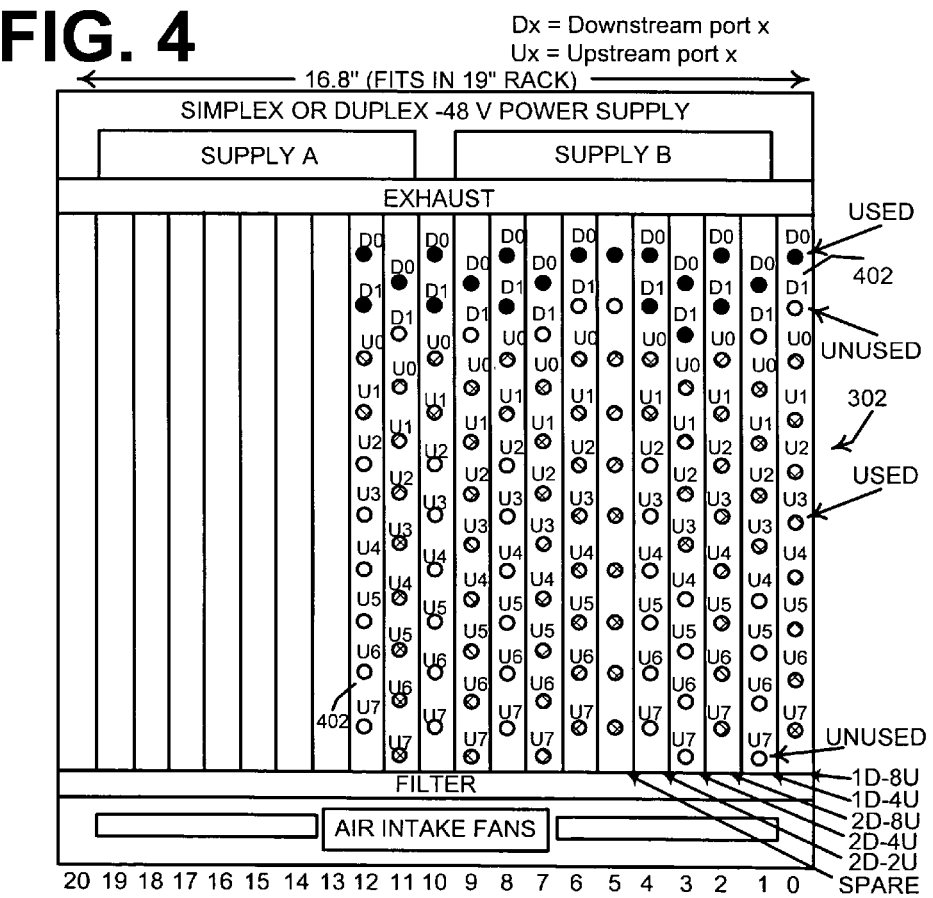

METHOD AND APPARATUS FOR DECREASING CABLE INSTALLATION TIME AND CABLE INSTALLATION FAULTS

FIELD OF THE INVENTION

The present invention relates to a method and apparatus for decreasing cable installation times and cable installation faults in a cable modem termination system.

BACKGROUND OF THE INVENTION

The world is on the verge of a revolution that promises to change the way the Internet works and it is guaranteed to change the way the entire world communicates, works and plays. The revolution is the introduction of quality of service (QoS) to the Internet. This QoS revolution is already beginning, because most computer networking products (switches and routers) have already added some type of QoS to their feature sets. Unfortunately, there are many different forms of QoS from which to choose and they are not all compatible with one another. Different standards committees (DiffServ, RSVP, MPLS, etc.) are still deciding which of many different QoS proposals will actually be used in the Internet, and hybrid solutions will likely be developed in the very near future that will enable the QoS revolution.

The change is important, because it will eliminate the current Internet routing model that provides the same "best effort" service to all users, all packets, and all traffic flows. When QoS is enabled in a ubiquitous, end to end fashion across the Internet, differentiated services will be permitted, and all packets will be treated differently. High priority packets will be routed with lower latency and lower jitter, while low priority packets may experience more delay and jitter. The throughput needs of each application will determine the priority associated with its corresponding traffic flows, and it is likely that advanced application programs of the future will dynamically change the priority of traffic flows to match the very needs of the user through the entire duration of the session.

Since all packets will not be passed using the same priority level, it follows that all packets cannot be billed using the same charges in the future either. Future Internet users are likely to pay differently for different classes of service, and they may even be billed on a usage basis, e.g., per-minute, per packet, or per byte, similar to the billing schemes used for long distance telephone service today. The use of high priority traffic flow for an application will undoubtedly result in higher Internet usage costs than the use of low priority traffic flows and service level agreements (SLAs) between the Internet user and their service provider will detail the available priority and throughputs in and their associated costs. These changes in the Internet billing model represent an incredible revenue generating potential for access providers that can provide and bill for these new differentiated services, and multiple system operators (MSOs) are key members of this group.

MSOs are positioned in an ideal location within the Internet to play a major role in the QoS revolution, and they will be able to capitalize on the resulting changes. This is because the MSOs are positioned to act as the QoS gatekeeper into the future Internet. They can perform this function because they have access to each subscriber's service level contract and can appropriately mark the priority of all packets that are injected into the Internet by their subscribers. In fact, the MSOs head end equipment, the cable modem termination system CMTS is actually the first piece of trusted equipment not owned by the subscriber to which subscriber packets must pass on their way to the Internet. The CMTS is positioned at the head end office and it provides basic connectivity between the cable plant and the Internet. FIG. 1 illustrates a simplified cable data system 10 with a CMTS 30. The CMTS 30 is connected through Internet link 40 to the Internet 20. The CMTS 30 is also connected through various cable links 50 to a plurality of subscribers 60.

The MSO also provides customer subscription packages and is able to offer (and bill for) many different subscriber service levels. In addition, if the CMTS equipment permits it, the MSO will also be able to offer dynamic service level upgrades to its subscribers. Features contained within an MSOs CMTS must provide most of these revenue generating QoS capabilities. This will result in even greater increases in revenues if the MSOs can maintain adequate counts on usage of different services levels consumed by its subscribers.

As set forth above, this CMTS provides basic connectivity between the cable plant and the local area network that interfaces to an edge router on the Internet. The CMTS is responsible for appropriately classifying, prioritizing, flow controlling, queuing, scheduling and shaping all the traffic flows between cable data subscribers and the Internet. As a result, this type of service experienced by the cable data subscribers will primarily be determined by the features in the CMTS core.

When selecting a CMTS for cable data deployment or expansion, MSOs have several different options from which to choose. The choice is complicated by a broad spectrum of prices and features such as reliability levels, ease of use, controllability, manageability, observability, support for various interfaces, support for various counts and measurements, support for proprietary features and feature upgrades, vendor service levels, etc. The CMTS selection process is even further complicated by the fact that a particular set of CMTS features that are required in one head end area may actually be undesirable in a different head end area because subscriber usage patterns and traffic profiles within the one region may be entirely different from those in another region.

Nevertheless, there is one CMTS feature that will undoubtedly be desirable and necessary for most of the head end that almost all of the MSOs as cable data service expands into the future. This feature is scalability. When referring to the size of a CMTS, the term scalable can be assigned two different meanings. According to one definition, a scalable CMTS should allow growth along a graduated path from very small sizes to very large sizes without imparting any large costs increments onto the MSO at any step along the graduated growth path. According to a second definition, a scalable CMTS should be capable of reaching the maximum capacity for size permitted by the underlined CMTS technology. For many reasons, MSOs might want to look for both of these scalability features when making their CMTS purchasing decisions.

The first of these features (graduated growth) is desirable in a CMTS because cable data services almost always greeted with incredible popularity when ever it enters a new subscription area. This typically leads to the dramatic increase in subscribers within a very short interval of time. To accommodate the sporadic usage increases, the CMTS must be able to rapidly increase the number of downstream and upstream channels being delivered to the subscribers. Any delay in this channel increase may force an MSO to temporarily over subscribe the existing cable data channels.

The densely packed subscribers on the over subscribed channels are likely to complain and/or lose interest in the service giving the competitors with cable data service a chance to steal subscribers.

Even an established cable data service area where the upstream and downstream channel counts have been nicely matched to the current subscriber base, the subscriber demand for bandwidth will continually increase over time as new bandwidth hungry Internet applications are introduced. This increase in bandwidth demand will manifest itself as an increase in the subscription rate for higher service level agreements and that will force the MSOs to pack fewer subscribers on a given channel, and that will again require the CMTS to be able to rapidly increase the number of channels even if it is providing to the same number of customers. This illustrates a second reason why graduated growth is a desirable feature in a MSOs CMTS.

The second definition of scalability (maximum capacity) is also a desirable feature within a CMTS, because the ultimate subscriber rates for cable data service are likely to approach the 20–25% levels within these established service areas. Thus, a typical head end supporting 60,000 cable TV subscribers may need to support up to 15,000 cable data subscribers. If future bandwidth demands limit the MSOs to only 500 cable data subscribers per downstream channel, then the maximum equipped CMTS should be capable of supporting up to 30 downstream channels. In addition, if the typical head end requires 4 upstream channels to be associated with each downstream channel, then the maximally equipped CMTS should be capable of supporting up to 120 upstream channels. Unfortunately, accommodating all of these (30+120)=150 connections out of the CMTS will require a large amount of cabling. Each of the 150 required connections must be transported on a coaxial cable. In a well designed system with high availability, the system repair time should be kept to a minimum, so the bundle of cables emanating from the CMTS will likely be coming from the backside of the system chassis to allow office technicians to rapidly replace faulty circuit cards by pulling them off the front side of the system chassis without having to remove and restore the cabling that emanates from the backside of the chassis.

Another feature that will undoubtedly be required at most feature at CMTS products is flexibility. In particular, CMTS' must be able to accommodate the many different traffic profiles throughout the usage area. This implies that the equipment of the CMTS chassis will be different with each head end office because the equipment must be customized to match the input demands of the customers connected to each head end.

As an example, in some areas, this may require circuit cards that require one upstream channel for each downstream channel also known as 1D:1U circuit cards. In other areas, this may require circuit cards support for upstream channels for each downstream channel which is also known as a 1D:4U circuit card. In still other areas, this may require circuit cards that support each upstream channels with each downstream channel also known as a 1D:8U circuit card. Many other types of useful circuit cards can also be envisioned including, but not limited to, 1D:3U circuit cards, 2D:8U circuit cards, 2D:4U circuit cards, and 2D:2U circuit cards. In general, any type of circuit cards of type nD:nU can be envisioned wherein m and n are non-negative integers.

To make matters even worse, the CMTS chassis within a single head end office is likely to require several different types of front circuit cards to accommodate different traffic profiles on different cables leaving the head end office. Thus, a single CMTS might need to be equipped with b 1D:1U circuit cards, c 1D:4U circuit cards, d 1D:8U circuit cards, e 1D:3U circuit cards, f 2D:8U circuit cards, g 2D:4U circuit cards, h 4D:4U circuit cards and i MD:NU circuit cards where b, c, d, e, f, g, h, i, m and n are non-negative integers.

Given that backside cabling is likely to become more popular over time, as high availability CMTS' become more popular, it is apparent that a fundamental problem will develop. The problem is centered around the difficulties that will be encountered by the cable office technicians that are responsible for correctly installing and maintaining the many cables that must be connected to the backside of the high capacity next generations CMTS chassis. Correct connection for the many cables to the backside of the chassis is itself a difficult task. But this task is exasperated by the inclusion of many different circuit card types that can be equipped in the front side of the chassis. When connecting the cables the office technician will typically not be able to see the type of circuit cards that are equipped in the front side of the chassis. As a result, correct connection of the backside cable will require the technician to remember or record the circuit card equippage (circuit card type and circuit card placement in the front card of the chassis).

Unfortunately, in the hectic environment of a cable head end office, this approach is prone to cabling errors. In its most benign form, a cabling error will merely result in delayed delivery of the service to subscribers while the incorrect system operation that results from the incorrect cabling is diagnosed. In even more catastrophic scenarios, the incorrect cabling can literally damage the equipment on either end of the cable resulting in increased equipment costs and delayed delivery of the service to subscribers. In either case, the result is not desirable, so a technique for reducing the possibility of these cabling errors is likely to be a benefit to the technician and to the head end office.

SUMMARY OF THE INVENTION

A method and apparatus for decreasing cable installation times and cable installation faults is disclosed. According to one embodiment of the present invention, the back panel of the CTMS has a light source, for example an LED associated with each connector on the back plane. When a circuit card is plugged into the front plane of the CMTS the card activates the light source on the back plane to indicate whether an active channel is connected to the connector and what type of channel the active channel is.

According to one embodiment of the present invention, an apparatus for a cable modem termination system having front and rear sides is disclosed wherein the front side accepts electronic circuit cards and the electronic signals from which where to be transferred to connectors mounted at the rear side. A panel coupled to the rear side of the CMTS has at least first and second openings therethrough. A first connector extends through the first opening is operationally coupled to a first electronic circuit card installed in the CMTS at the front side of the CMTS. A light source is visible through the second opening in the panel to illuminate the status of what should be connected to the connectors on the back panel.

BRIEF DESCRIPTION OF THE DRAWINGS

The teachings of the invention can be readily understood by considering the following detailed description with conjunction with accompanied drawings, in which:

FIG. 3 illustrates a front plane of a CMTS according to one embodiment of the invention;

FIG. 4 illustrates a back plane of a CMTS according to one embodiment of the present invention;

DETAILED DESCRIPTION

Figure 1:
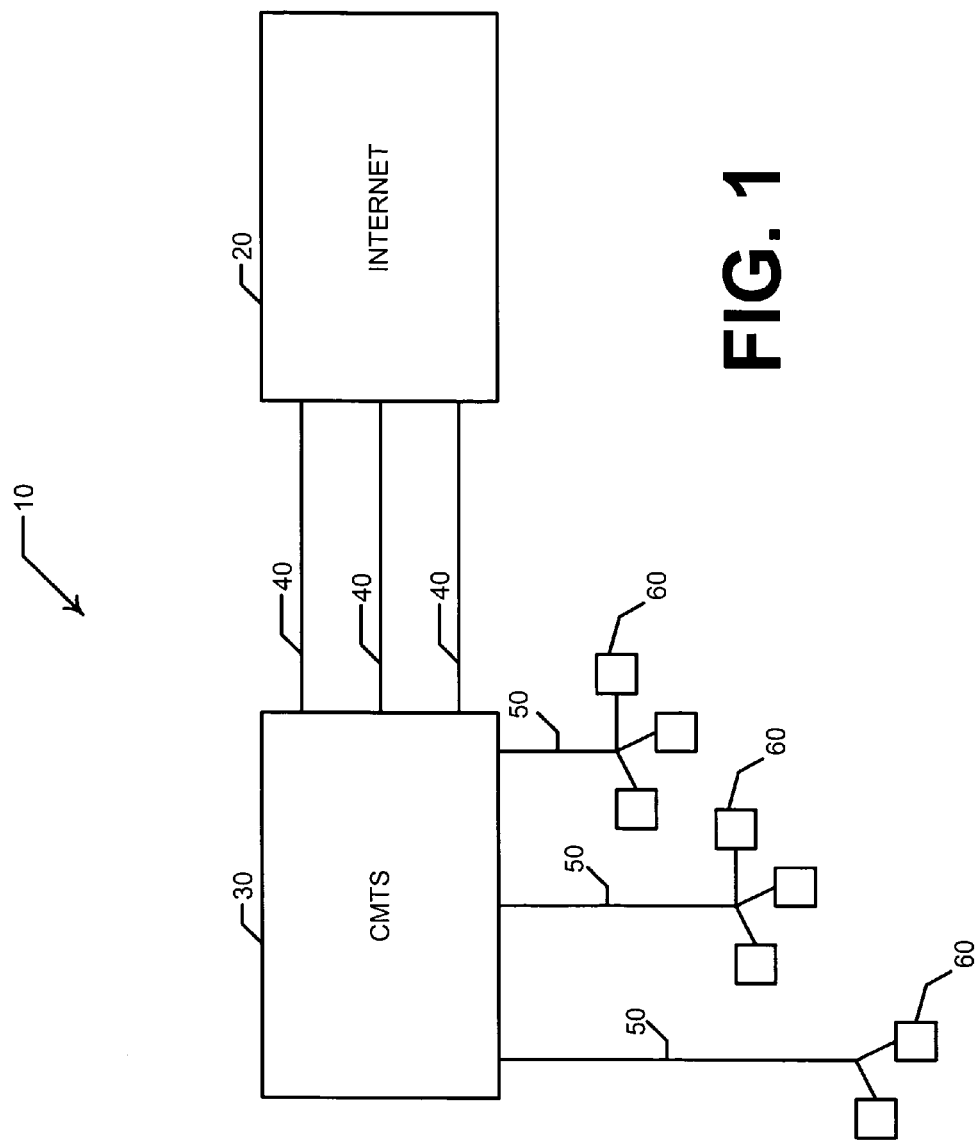
FIG. 1 illustrates an exemplary cable data system.
Figure 2:
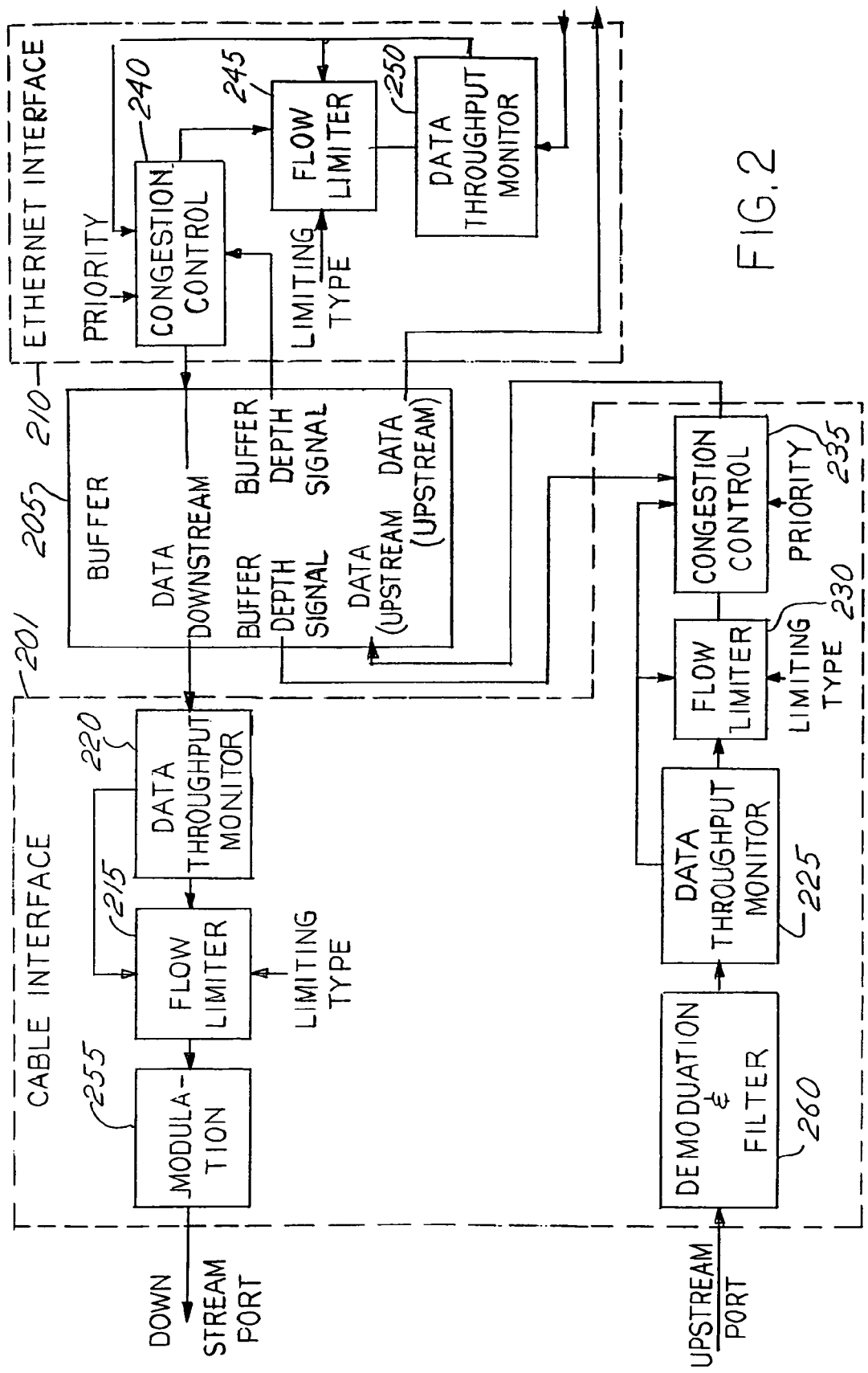
FIG. 2 illustrates a CMTS according to one embodiment of the invention.

FIG. 2 illustrates an embodiment cable modem termination system (CMTS) apparatus according to one embodiment of the invention. The CMTS apparatus of FIG. 2 is comprised of a cable interface (201) that is coupled to a buffer circuit (205). The buffer circuit (205) is coupled to an Ethernet interface (210). In the preferred embodiment, each of the individual circuits (201, 205, and 210) reside physically on separate circuit boards. In alternate embodiments, any circuits having substantially the same function can reside on one circuit board or even one integrated circuit. In other words, the present invention is not limited to three separate circuit boards.

The cable interface (201) is responsible for interfacing the CMTS to the home cable modem apparatus. The cable interface (201) also provides the functions of modulation and demodulation.

The cable interface circuit is comprised of a downstream packet flow path and an upstream packet flow path. The downstream packet flow path is comprised of a data throughput monitor (220) that is coupled to a flow limiter (215). The data throughput monitor (220) has an input that is coupled to the buffer circuit (205) from which the data packets flow and a feedback from the upstream path. The feedback from the upstream path is to allow a first CM to talk with other CMs. The data throughput monitor (220) has the task of determining the rate of data packet flow.

In the preferred embodiment of the CMTS, the downstream data packet flow rate is typically either 30 or 40 Mbps for each 6 MHZ channel, using QAM techniques. Alternate embodiments use other flow rates. The cable company decides which data packet flow rate depending on the outcome desired by the company. The lower data rate is less susceptible to noise while the higher data rate can include more data per unit of time for the customers.

The data packet flow rate signal is fed into the flow limiter (215). This signal controls the flow limiter function. If the flow is greater than a predetermined level, $T_{max}$, the data packet flow can be limited. The flow limiter (215) reduces the data rate by dropping packets until the flow is reduced to below $T_{max}$.

Another input to the flow limiter (215) is the "limiting type" input. This control input is set by the cable company depending on how strict they wish a customer to adhere to the rules. If the "limiting type" input is set to "soft-limiting", the flow limiter (215) allows the data rate to go above the set data rate by a predetermined amount without dropping any packets.

Some cable companies may strictly limit a customer to $T_{max}$. In this case, the "limiting type" control input is set to "hard-limiting". If the data rate goes over the set hard limit, the flow limiter (215) drops any packets that force the customer to exceed $T_{max}$. The output of the flow limiter (215) is coupled to the cable that runs to the customers' cable modems.

The output of the flow limiter (215) is input to the modulator (255). This block (255) performs the QAM needed to transmit the data to the CMs.

The upstream data path is comprised of a demodulator and filter (260) that converts the QAM signal into data bits in order to be processed by the other blocks in the upstream path. The demodulated data bits are input to a data throughput monitor (225) that is coupled to the upstream port from the customer's CM. This data throughput monitor (225) has the same functionality as the downstream monitor (220) of monitoring the data rate but in the upstream direction to the Internet.

In the preferred embodiment, the upstream data rate can be in the range of 320 kb to 10.24 Mbps. Alternate embodiment use other rates.

The upstream data throughput monitor (225) is coupled to a flow limiter (230). This flow limiter has similar functionality to the flow limiter (215) in the downstream path. The upstream path flow limiter (230) has the data rate input from the data throughput monitor (225) as well as the "limiting type" control input that, in the preferred embodiment, is set to either "hard-limiting" or "soft-limiting" depending on the cable company rules. As in the downstream flow limiter (215), the upstream flow limiter, depending on the "limiting type" input, drops all packets that force the customer to exceed $T_{max}$.

The upstream path further comprises a congestion control block (235) that is coupled to the upstream data path out of the flow limiter (230). The data packets from the upstream data path flow through the congestion control block (235) to the buffer circuit (205). The function of the congestion control block (235) is to drop packets when the buffer depth is reaching a maximum point. By dropping the packets before they reach the buffer, the buffer will not overflow.

In order to accomplish the task of congestion control, the congestion control block (235) has control inputs that are used to determine when to drop packets and which packets to drop. In the preferred embodiment, these control inputs include the data rate signal from the upstream data throughput monitor (225), a buffer depth signal from the buffer (205), and a priority signal.

The data rate signal from the upstream data throughput monitor (225), as described above, quantizes the data rate and feeds that value to the congestion control block (235). The buffer circuit depth signal from the buffer circuit (205) instructs the congestion control block (235) as to the depth of the buffer. In other words, if the buffer (205) is 75% full, the buffer depth signal instructs the congestion control block (235) of this.

The priority signal that is input to the congestion control block (235) informs the congestion control of the priority of each packet. This is important in determining which packets to drop.

A group of packets is assigned a priority based on the customer's level of service plan. If the customer has signed up for the basic service plan and paid the smallest fee for the most basic service, his packets are assigned a low priority. This priority is embedded in a packet identification that is assigned to the group of packets and is decoded when the group of packets enters the cable interface.

If the customer has signed up for the premium service plan with the cable company, his packets are assigned the highest priority. If the customer has signed up for any service plans that are in between the premium and the basic plans, this priority is also assigned to each packet. As described before, the priority is added to the packet identification for a particular group of packets.

A customer may also decide to dynamically change his service level for a given session. In this case, different packet groups from that particular customer will have different priorities assigned to different packet identifications.

As described subsequently in other figures, the congestion control block (235) of FIG. 2 uses the priority assigned to a group of packets to determine how to process that particular group of packets. The output of the congestion control block is input to the buffer circuit's upstream data flow input.

The buffer circuit (205) stores the packets until the Ethernet circuit (210) has time to process that packet. The packets are fed from the buffer circuit (205) to the Ethernet circuit (210) as more processing time is freed up.

The downstream path of the Ethernet circuit (210) is comprised of a data throughput monitor (250) that is coupled to the connection to the Internet. This monitor (250) provides substantially the same function as the previously described data throughput monitors on both the upstream and downstream paths.

The data packets from the Internet flow from the data throughput monitor (250) to the Ethernet's circuit flow limiter (245). This flow limiter (245) has substantially the same functionality as the above described flow limiters. This flow limiter also has the same inputs as described previously: the quantized data rate and the "limiting type" control input.

The data packets flow from the flow limiter (245) to the congestion control block (240). As in the upstream congestion control block (235), the Ethernet's downstream congestion control block (240) has the three control inputs to determine which packets to drop: the quantized data rate, the buffer depth signal, and the packet priority signal. The congestion control block then drops a particular packet based on these control signals.

The downstream data flows from the congestion control block to the buffer circuit (205). The buffer circuit (205) stores the packets until the cable interface circuit has the processing time to work on additional packets.

The buffer circuit (205) is comprised of 128 MB of RAM, in the preferred embodiment. Alternate embodiments use other values of RAM or even other types of memory instead of RAM. The alternate types of memory include hard drives or other types of temporary memory.

Most of the functions illustrated in FIG. 2 may be implemented in various ways. These functions can be performed in software by a processor or multiple processors performing each function. Each function can also be implemented in discrete logic hardware, a digital signal processor, or some other form of programmable logic.

According to one embodiment of the invention, the CMTS is designed so that all of the circuit cards are plugged into the front of the CMTS chassis and all of the cables are connected to the back of the CMTS chassis. As illustrated in FIG. 3, a plurality of slots 304 are provided on the front of the CMTS chassis 302 for receiving a plurality of circuit cards. As noted above, different types of circuit cards can be used to accommodate different traffic profiles. The back of the CMTS chassis according to one embodiment of the invention is illustrated in FIG. 4. The back of the CMTS chassis has a slot 402 with connectors for each of the available slots 304 on the front of the CMTS chassis. In each slot, a plurality of connectors are provided. In this example, 10 connectors are provided for each slot. It will be understood that any number of connectors could be provided in each slot and the invention is not limited to the embodiment illustrated in FIG. 4. However, for ease of operation and flexibility, the number of connectors provided for each slot should correspond to the maximum number of channels that may be required by a circuit card plugged into the front of the CMTS chassis.

According to one embodiment of the invention, a label indicating whether the connector is for an upstream channel or a downstream channel can optionally be placed near each connector. In FIG. 4, labels D0 and D1 are used to designate downstream channels while U0, U1, U2, U3, U4, U5, U6, and U7 are used to designate upstream channels, but the invention is not limited thereto. A light source is also placed next to each connector. The light source can be one of many different devices, such as, for example, light emitting diodes (LEDs), light pipes, incandescent lamp, optical fiber, etc. The light sources can be color coded so as to indicate the type of channel the connector is associated with. For example, one color such as amber, illuminated on the LED can indicate an active upstream channel is connected to the connector, while a second color, such as green, illuminated on the LED can indicate an active downstream channel is connected to the connector. In this embodiment, if the LED is not illuminated this condition indicates that the channel associated with the connector is not active.

Figure 5:
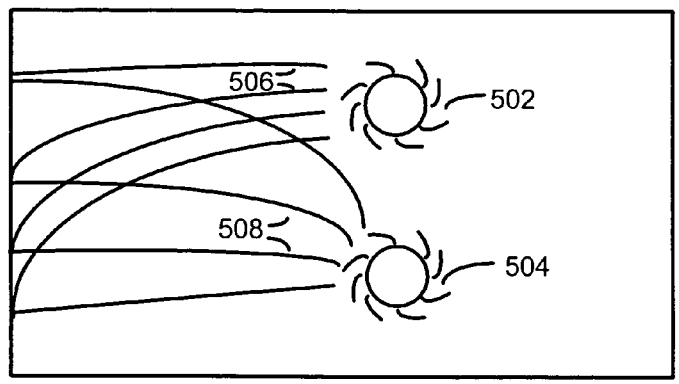
FIG. 5 illustrates a side view of a CMTS according to one embodiment of the invention.

In other embodiments, light pipes can be used to display the appropriate color next to connectors associated with active channels. As illustrated in FIG. 5, for example, an amber light source 502 can be connected to light pipes 506 going to one or more light displays next to the connectors on the back of the CMTS chassis and a green light source 504 can be connected to light pipes 508 going to one or more light displays on the back of the CMTS chassis.

Alternatively, each connector can have two light sources associated with it, so that any connector on the back-side of the CMTS chassis can be connected to any type of channel on the front-side circuit boards. Furthermore, more than 2 colors and/or light sources can be used to differentiate between more than 2 types of channels. For example, a chassis that supports both quad and octal Ethernet circuit cards in the front-side of the CMTS chassis could use this lighting technique to illuminate either four or eight of the eight LEDs that would be displayed on the back-side of the CMTS chassis.

Alternatively, certain connectors on the back-side of the CMTS chassis can be pre-defined to be used only for upstream channels, while other connectors can be pre-defined to be used only for downstream channels. The connectors used only for upstream channels would then require single color LEDs with, for example, the color amber, whereas the connectors used only for down stream channels would then require single color LEDs with, for example, the color green.

Figure 6:
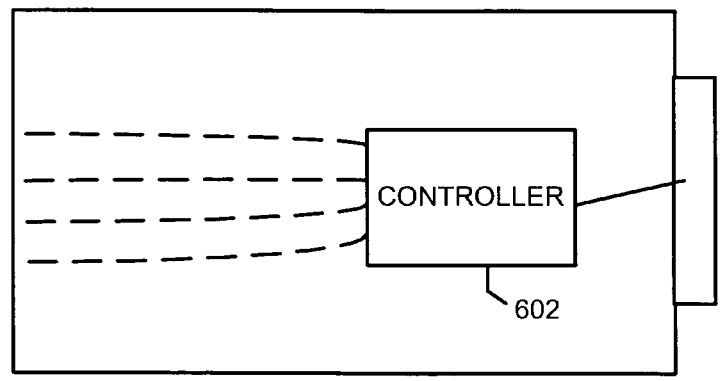
FIG. 6 illustrates a side view of a CMTS according to one embodiment of the invention.

When a circuit card is plugged into the front of the CMTS chassis, the CMTS determines which channels are active and what type of channel it is. A controller 602, illustrated in FIG. 6, is connected to the slots provided in the front of the CMTS chassis. The controller 602 determines whether each channel is active and the type of active channels using known techniques. The controller 602 then sends signals to the LEDs on the back of the CMTS chassis associated with the active channels to illuminate. In addition, the signals may also indicate the color of illumination. In the embodiment illustrated in FIG. 5, the controller 602 sends signals opening and closing the appropriate light pipes 506 and 508 to illuminate the appropriate light displays on the back of the CMTS chassis.

In another embodiment, the circuit card plugged into the front of the CMTS chassis can send signals to illuminate the LEDs on the back of the CMTS chassis associated with the active channels. In addition, the signals may also indicate the color of illumination.

While exemplary systems and method embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. An apparatus for a cable modem termination system (CMTS) having front and rear sides, said front side accepting electronic circuit cards, electronic signals from which are transferred through connectors mounted at said rear side, comprising:
   a panel coupled to the rear side of the CMTS, said panel having at least one pair of first and second openings there through, said first and second openings being proximately located to one another;
   a connector extending through said first opening of the at least one pair of first and second openings and operationally coupled to a corresponding electronic circuit card installed at the front side of the CMTS; and
   a light source, visible through said second opening of the at least one pair of first and second openings, the illumination status of which is determined by said corresponding electronic circuit card.

2. The apparatus according to claim 1, wherein said connector is a coaxial cable connector.

3. The apparatus according to claim 1, wherein said light source is remotely located from said second opening.

4. The apparatus according to claim 1, wherein said light source is comprised of at least one light emitting diode.

5. The apparatus according to claim 1, wherein said light source is an incandescent lamp.

6. The apparatus according to claim 1, wherein said light source is comprised of an optical fiber.

7. The apparatus according to claim 1, wherein said light source is a light pipe, optically coupling light from a light source to said second opening.

8. The apparatus according to claim 1, wherein different colors are illuminated from the light source to represent different types of channels.

9. The apparatus according to claim 8, wherein a plurality of light sources are associated with each connector, wherein each light source associated with a connector is illuminated in different colors.

10. A cable modem termination system (CMTS) having front and rear sides, said front side accepting electronic circuit cards, electronic signals from which are transferred through connectors mounted at said rear side, said CMTS comprising:
    a panel coupled to the rear side of the CMTS, said panel having at least one pair of first and second openings there through, said first and second openings being proximately located to one another;
    a connector extending through said first opening of the at least one pair of first and second openings and operationally coupled to a corresponding electronic circuit card installed at the front side of the CMTS;
    a controller connected to said first electronic circuit card for determining the status of channels associated with said first electronic circuit card; and
    a light source, visible through said second opening of the at least one pair of first and second openings, the illumination status of which is determined by said controller.

11. The apparatus according to claim 10, wherein said connector is a coaxial cable connector.

12. The apparatus according to claim 10, wherein said light source is remotely located from said second opening.

13. The apparatus according to claim 10, wherein said light source is comprised of at least one light emitting diode.

14. The apparatus according to claim 10, wherein said light source is an incandescent lamp.

15. The apparatus according to claim 10, wherein said light source is comprised of an optical fiber.

16. The apparatus according to claim 10, wherein said light source is a light pipe, optically coupling light from a light source to said second opening.

17. The apparatus according to claim 10, wherein different colors are illuminated from the light source to represent different types of channels.

18. The apparatus according to claim 17, wherein a plurality of light sources are associated with each connector, wherein each light source associated with a connector is illuminated in different colors.

19. A cable modem termination system (CMTS) having front and rear sides, comprising:
    a plurality of slots on said front side for accepting at least one electronic circuit card;
    a plurality of rows of connectors on said rear side, wherein each row of connectors corresponds to a slot on the front side;
    at least one light source associated with, and proximate to, each connector on the back side;
    a controller connected to each slot for determining whether an electronic circuit card is installed into the corresponding slot on said front side, and if so, the status of one or more channels associated with said card, each channel corresponding to a connector in the row corresponding to the slot, wherein said controller sends a signal or signals corresponding to the status of the one or more channels to the respective light source or sources associated with the one or more corresponding connectors.

20. The apparatus according to claim 19, wherein said connector is a coaxial cable connector.

21. The apparatus according to claim 19, wherein said light source is remotely located from said second opening.

22. The apparatus according to claim 19, wherein said light source is comprised of at least one light emitting diode.

23. The apparatus according to claim 19, wherein said light source is an incandescent lamp.

24. The apparatus according to claim 19, wherein said light source is comprised of an optical fiber.

25. The apparatus according to claim 19, wherein said light source is a light pipe, optically coupling light from a light source to said second opening.

26. The apparatus according to claim 19, wherein different colors are illuminated from the light source to represent different types of channels.

27. The apparatus according to claim 26, wherein a plurality of light sources are associated with each connector, wherein each light source associated with a connector is illuminated in different colors.

* * * * *